3,397,143
METHOD FOR THICKENING SLUDGE
Heinrich Sontheimer, Falkenstein, Taunus, and Arthur J. Fischer, Frankfurt am Main, Germany, assignors to Fuller Company, Catasauqua, Pa., a corporation of Delaware
No Drawing. Filed June 28, 1966, Ser. No. 561,015
Claims priority, application Germany, July 2, 1965, M 65,778
3 Claims. (Cl. 210—49)

ABSTRACT OF THE DISCLOSURE

A method for thickening sludges in a basin by operating a stirring mechanism so that the stirrer traverses the basin in a series of reversing forward and backward movements through the basin. An additional step of allowing a quiescent period for settling after each reversal of the stirrer may be incorporated into the process.

---

This invention relates to a method for the thickening of solids containing liquids. More particularly this invention relates to a method for thickening of waste sludge.

It is an object of this invention to provide a improved method of operating sludge thickeners in a manner to achieve higher sludge concentrations. It is a specific object of this invention to provide a method of stirring sludge undergoing thickening whereby thickening and separation of liquid are accelerated.

The simplest and most common method of sludge concentration is sedimentation wherein the solids contained in the liquid gradually settle, by subsidence, from the liquid. The term "sludge" is used herein to designate municipal or industrial sludges including activated and primary sewage sludges as well as anaerobically digested sludges or a mixture of any of these sludges.

Sedimentation basins for concentrating sludges are generally either rectangular having a longitudinal flow or circular basins having radial flow. The supernatant or overflow liquid is removed through launders and the settling sludge is accumulated by a scraper and moved to a collecting trough or sump, from where it is transferred by sludge pumps or suitable conveying equipment to disposal or to further dewatering by filtration or centrifugation. Depending on such factors as surface load and retention time, sedimentation can achieve solids concentration of about 7 to 8% by weight.

In order to reduce the load on filters or centrifuges following thickening, it is very desirable to achieve as high a degree of sludge concentration as is possible during the thickening process.

It is well known in the art of sewage treatment that the rate at which sludge thickens can be accelerated by gently stirring the sludge mixture. It is also well known that the thickening effect by stirring can be improved by slowly moving a rake arm which is built like a picket fence through the liquid undergoing thickening. Typical of the picket fence type of thickener is the unit described in U.S. Patent No. 1,938,894.

The rake aids thickening by promoting aggregation of particles and also releases separated liquid to the surface by opening channels to the liquid surface at the trailing side of the pickets.

Thickening by using a stirring device is only enhanced when there is adequate relative motion between the waste undergoing treatment and the stirring mechanism. Many times, when the waste sludge undergoing treatment is viscous and voluminous, the stirring mechanism creates a rotary or vortex motion in the waste which is detrimental to proper thickening.

Also for proper thickening, to a degree greater than that attainable solely by simple sedimentation, a quiescent period following stirring is required for flocculation and subsidence of the mechanically disturbed sludge.

It has been discovered that a significant improvement in the degree of thickening obtainable in the picket fence type of thickener can be achieved by operating the stirring mechanism so that the stirrer traverses the basin in a series of periodic forward movements or in a series of forward and backward intermittent movements.

In the field of metal rolling a similar intermittent forward and backward operation is used in the fabricating of seamless pipe. The name given to characterize this type of movement is Pilgerschritt or "pilgrim step." Applying this concept to a thickener, during a single pilgrim step operation the sludge is stirred repeatedly in opposite directions in a portion of the tank while it is allowed to settle out in the remaining area of the tank.

For instance, taking a thickener of the circular type wherein the stirring mechanism rotates around a center shaft, the forward rotation might be 60° followed thereafter by a reverse motion of 30° and so on. In this manner, the mechanism covers, in one complete rotation, two times the basin perimeter. The efficiency of this stirrer can be improved further by interruping for a short time, for instance 0.5 to 3 minutes, the motion after every forward movement and after every reverse movement of the stirrer.

In this manner, the rotation time is prolonged. This also allows a longer settling time for sedimentation of the sludge in the areas of the basin not in contact with the stirrers. The stirring mechanism of known construction can be operated in the manner described herein simply by installing a reversing motor and suitable controls.

This novel method of stirring prevents, particularly with viscous sludges, the creation of a vortex which results in little or no relative motion between the sludge and stirring mechanism. Also, this method allows the operation of stirrers at higher rotational speeds which helps to separate the entrapped liquid from the solids. Agitation of the sludge due to the higher speed of the stirrer is not detrimental because it occurs only on a limited area of the tank and any agitation is compensated for by the longer settling time in the idle areas of the tank.

As pointed out above, this invention process can be applied to both circular and longitudinal thickening basins. The process differs from other methods such as cyclic scraping of sludge wherein the basin is scraped more often in the areas in which greater sludge accumulation occurs, as in this process, all areas of the basin are stirred evenly.

A number of series of periodic or reciprocable movements are possible. The stirring operation may consist of a series of forward motions with time intervals between; a forward and backward motion with a time interval and then the backward motion, and so on. The length of the stirring cycle varies with the process requirements, but generally $\frac{1}{20}$ to $\frac{1}{5}$ of the basin length or perimeter is covered during each movement.

To determine the effectiveness of this type of stirring, the following test was run:

A daily flow of 250 cubic meters of sewage sludge with a solids content of 4% was introduced into a thickener of the circular type having a diameter of 10 meters and a depth of 3.5 meters. The thickener had a conventional picket rake arm rotating constantly at 3 centimeters per second.

Operating the thickener as a standard sedimentation thickener without stirring with a loading of 0.14 cubic meter per square meter per hour and a retention time of 26 hours, a sludge concentration of 6.5% weight percent solid was achieved. Addition of picket type stirrers of 250 centimeter length evenly spaced at 75 centimeters along the rotating rake arm resulted in an improvement of the sludge solids content to 7 to 7½%.

The same thickener was then operated in the prescribed manner, namely that the scraper was rotated forward for two minutes, thereafter backwards for 1½ minutes, and then forward again, etc. The solids content achieved was over 9%. With a small dose of calcium hydroxide, about 8 grams per cubic meter of sludge, a thickening to about 12% solids was reached. In this instance, the scraper speed was increased to 5 centimeters per second.

It will be obvious to one skilled in the art that various combinations of forward and backward stirrer motions and time intervals can be used to achieve the results described herein without departing from the scope and spirit of the invention.

We claim:

1. The method of operating a thickening basin having influent means for liquid to be thickened, effluent means for overflow, and reciprocable stirring means for promoting thickening which comprises traversing the basin with said stirring means in a series of bi-directional movements in a manner whereby the stirrer is moved forward a first predetermined distance which represents a relatively small fraction of the basin cross sectional area, thereafter reversing the direction of travel of said stirrer and moving the stirrer backward a distance less than said first predetermined forward distance, again reversing the direction of travel of the stirrer and moving the stirrer forward a distance corresponding to said first predetermined distance, and thereafter continuing said reversing movements to traverse the tank.

2. The method of claim 1 wherein a quiescent period to allow settling occurs after each reversal of direction of said stirrer.

3. A method of operating a circular thickening basin having influent means for sludge, effluent means for overflow, outlet means for thickened sludge, and a reversible rotatable picket rake arm; which method comprises moving said arm forward through a first predetermined angle of rotation, which first predetermined angle comprises a small fraction of one revolution, reversing the direction of travel of said rake and moving the rake in the reverse direction through an angle less than said first predetermined angle, again reversing the direction of travel of said arm and moving it forward through an angle corresponding to said first angle of rotation, and continuing said periodic rotational movement to traverse the entire basin.

References Cited

UNITED STATES PATENTS

| 566,607 | 8/1896 | McGowan | 210—528 X |
| 2,768,749 | 10/1956 | Easterday | 210—528 X |
| 3,235,083 | 2/1966 | Sontheimer et al. | 210—83 |

FOREIGN PATENTS 577,517    5/1946    Great Britain.

MICHAEL E. ROGERS, *Primary Examiner.*